(12) United States Patent
Hilker et al.

(10) Patent No.: US 8,996,601 B2
(45) Date of Patent: Mar. 31, 2015

(54) METHOD AND APPARATUS FOR MULTIPLY INSTRUCTIONS IN DATA PROCESSORS

(75) Inventors: Scott A. Hilker, San Jose, CA (US); George Q. Phan, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 350 days.

(21) Appl. No.: 13/529,619

(22) Filed: Jun. 21, 2012

(65) Prior Publication Data

US 2013/0346463 A1    Dec. 26, 2013

(51) Int. Cl.
| | | |
|---|---|---|
| *G06F 7/533* | (2006.01) | |
| *G06F 7/483* | (2006.01) | |
| *G06F 7/52* | (2006.01) | |
| *G06F 7/487* | (2006.01) | |
| *G06F 7/53* | (2006.01) | |
| *G06F 7/544* | (2006.01) | |

(52) U.S. Cl.
CPC *G06F 7/52* (2013.01); *G06F 7/483* (2013.01); *G06F 7/4876* (2013.01); *G06F 7/5318* (2013.01); *G06F 7/5338* (2013.01); *G06F 7/5443* (2013.01); *G06F 2207/382* (2013.01); *G06F 2207/3884* (2013.01)
USPC .......................................................... 708/629

(58) Field of Classification Search
None
See application file for complete search history.

(56) References Cited

U.S. PATENT DOCUMENTS

| | | | | |
|---|---|---|---|---|
| 5,265,043 A | * | 11/1993 | Naini et al. .................... | 708/625 |
| 5,790,446 A | * | 8/1998 | Yu et al. ......................... | 708/625 |
| 6,099,158 A | * | 8/2000 | Gorshtein et al. ............. | 708/505 |
| 6,567,834 B1 | * | 5/2003 | Marshall et al. .............. | 708/626 |
| 2013/0346463 A1 | * | 12/2013 | Hilker et al. .................. | 708/620 |

* cited by examiner

*Primary Examiner* — David H Malzahn
(74) *Attorney, Agent, or Firm* — Park, Vaughan, Fleming & Dowler, LLP

(57) ABSTRACT

The disclosed embodiments relate to apparatus for accurately, efficiently and quickly executing a multiplication instruction. The disclosed embodiments can provide a multiplier module having an optimized layout that can help speed up computation of a result during a multiply operation so that cycle delay can be reduced and so that power consumption can be reduced.

23 Claims, 5 Drawing Sheets

METHOD AND APPARATUS FOR MULTIPLY INSTRUCTIONS IN DATA PROCESSORS

TECHNICAL FIELD

Embodiments of the subject matter described herein relate generally to data processors that execute instructions. More particularly, embodiments of the subject matter relate to a multiplier module for executing a multiply instruction.

BACKGROUND

A processing core can include multiple data processors that execute program instructions by performing various arithmetic operations. Examples of arithmetic operations that can be performed by a data processor (such as, for example, a CPU, GPU or combined CPU and GPU often referred to as accelerated processing units (APUs), and the like) include addition, multiplication, division, and the like. In addition, some processors can support more complex operations. For instance, one example is a multiply-and-accumulate (MAC) operation that computes the product of two numbers and adds that product to another number.

One conventional type of multiplier module includes booth encoder circuitry that is used to process a multiplier operand and generate control signals that are provided to corresponding booth multiplexers. The booth multiplexers use these control signals to process the multiplicand operand and generate partial products that are then provided to a compression tree. The compression tree includes a carry-save adder (CSA) array and a carry-save adder (CSA) coupled to the CSA array. The CSA array has inputs configured to receive the partial products, and includes a number of carry save adders (CSAs) implemented at different compressor levels for compressing the partial products to generate a sum and carry output.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY OF EMBODIMENTS

In accordance with some of the disclosed embodiments, a processor is provided that is configured to process a multiplicand operand and a multiplier operand. The processor includes a partial product array having a folded layout that is split into a low-side and a high-side. The partial product array includes a partial product generator, and a partial product reducer.

The partial product generator includes a plurality of booth encoders and a plurality of booth multiplexers. The booth encoders are arranged along a substantially diagonal path that extends between the high-side and the low-side. Each of the booth encoders is configured to perform booth encoding on a portion of the multiplier operand generate a particular select signal. Each of the booth multiplexers is configured to receive a particular version of the multiplicand operand, and one of the particular select signals generated by one of the booth encoders, and to generate a partial product such that the plurality of booth multiplexers collectively generate a plurality of partial products.

The partial product reducer is configured to receive and reduce the plurality of partial products to generate result outputs. The partial product reducer includes a carry-save adder array. The carry-save adder array includes a plurality of compressor levels that are interleaved with the plurality of booth multiplexers.

In accordance with one particular implementation of the disclosed embodiments, a multiplier module is provided for digitally multiplying a multiplicand operand by a multiplier operand. The multiplier module includes a partial product array having a folded layout that is split into a low-side and a high-side. The partial product array includes a plurality of booth encoders, a plurality of booth multiplexers and a carry-save adder array. Each of the booth encoders are configured to generate a particular select signal based on a portion of the multiplier operand. The booth encoders are arranged along a substantially diagonal path that extends between the high-side and the low-side. The booth multiplexers that collectively generate a plurality of partial products based on the multiplicand operand and the select signals generated by the booth encoders. The carry-save adder array includes a plurality of compressor levels that are interleaved with the booth multiplexers. The compressor levels include a plurality of carry-save adders that are each arranged in an interleaved manner with the booth multiplexers.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1A:
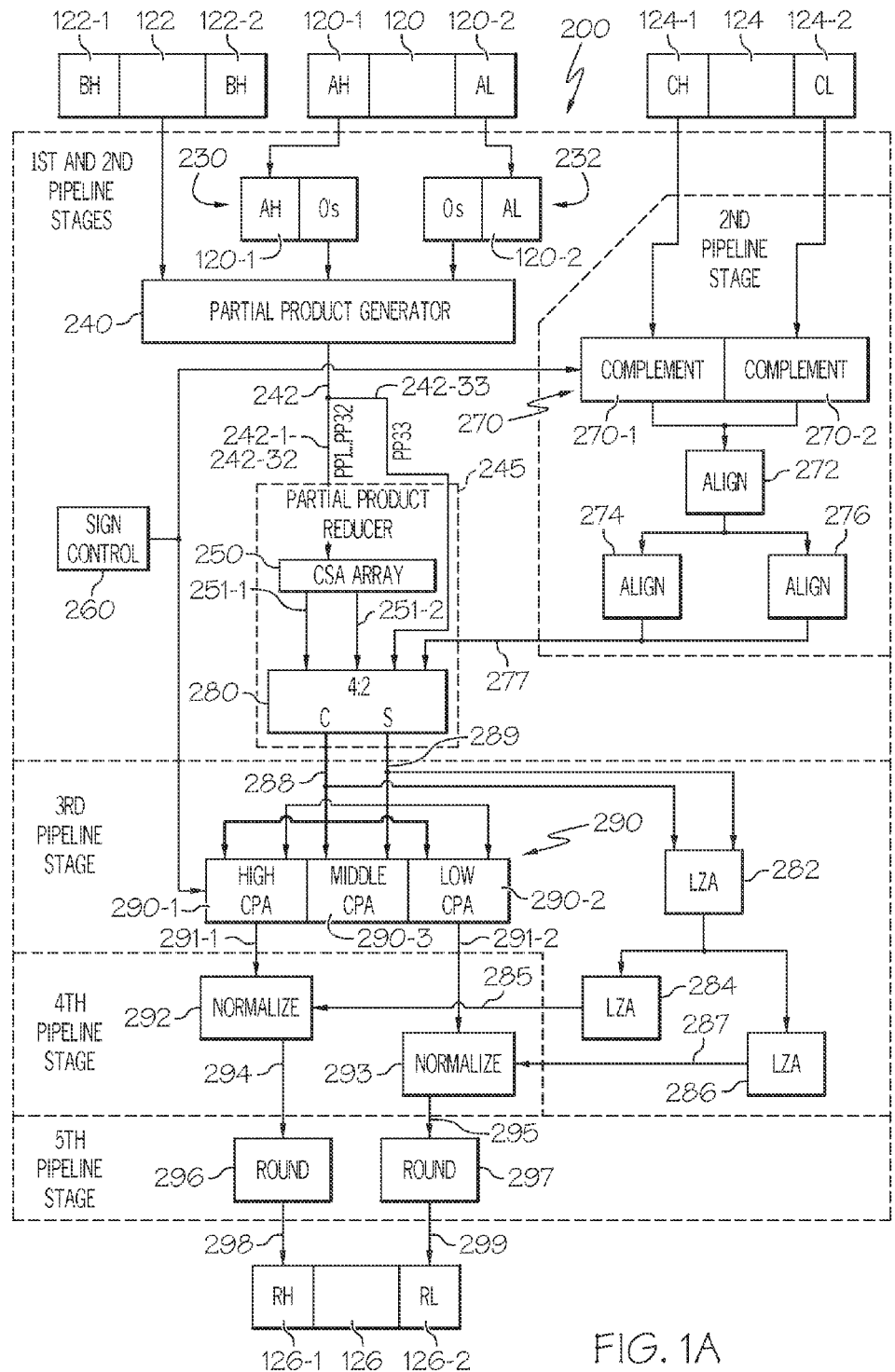
FIG. 1A is a logical block diagram illustrating a portion of an arithmetic processing unit that can be in accordance with some of the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to functional aspects of the devices and systems (and the individual operating components of the devices and systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment.

Definitions

As used herein, the term "instruction set architecture" refers to a part of the computer architecture related to programming, including the native data types, instructions, registers, addressing modes, memory architecture, interrupt and exception handling, and external I/O. An instruction set architecture includes a specification of a set of machine language "instructions."

As used herein, the term "instruction" refers to an element of an executable program provided to a processor by a computer program that describes an operation that is to be performed or executed by the processor. An instruction may define a single operation of an instruction set. Types of operations include, for example, arithmetic operations, data copying operations, logical operations, and program control operation, as well as special operations, such as permute operations. A complete machine language instruction includes an operation code or "opcode" and, optionally, one or more operands.

As used herein, the term "operand" refers to the part of an instruction which specifies what data is to be manipulated or operated on, while at the same time also representing the data itself In other words, an operand is the part of the instruction that references the data on which an operation (specified by an opcode) is to be performed. Operands may specify literal data (e.g., constants) or storage areas (e.g., addresses of registers or other memory locations in main memory) that contain data to be used in carrying out the instruction. As used herein, the term "opcode" refers to a portion of a machine language instruction that specifies or indicates which operation (or action) is to be performed by a processor on one or more operands. For example, an opcode may specify an arithmetic operation to be performed, such as "add contents of memory to register," and may also specify the precision of the result that is desired. The specification and format for opcodes are defined in the instruction set architecture for a processor (which may be a general CPU or a more specialized processing unit).

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. In addition, certain terminology may also be used in the following description for the purpose of reference only, and thus are not intended to be limiting. For example, terms such as "first," "second," and other such numerical terms referring to elements or features do not imply a sequence or order unless clearly indicated by the context.

FIG. 1A is a block diagram illustrating a portion of an arithmetic processing unit 200 in accordance with some of the disclosed embodiments. FIG. 1A illustrates a particular example of one specific embodiment in which the arithmetic processing unit is configured to execute a floating point multiply-and-accumulate instruction in a packed single-precision mode as well as higher precision modes (e.g., where multiplier, multiplicand and addend operands have a "packed single" format and two single-precision operations are performed in parallel). However, in a more general sense, as will be explained below, in some implementations, the illustrated portion of the arithmetic processing unit 200 can be used to execute a multiply instruction. Execution of either instruction involves digitally multiplying a N-bit wide multiplicand operand by a N-bit wide multiplier operand without performing an accumulate operation.

As will be appreciated by those skilled in the art, the arithmetic processing unit includes mantissa module (or datapath) that performs mathematical operations on the mantissa of the received operands and an exponent module (or datapath) that performs mathematical operations on the exponent portions of the floating-point operands. The mantissa module and the exponent module perform their operations in a substantially parallel manner. For sake of clarity, FIG. 1A illustrates the mantissa datapath of the arithmetic processing unit 200 and highlights how the mantissa datapath is configured to execute two concurrent single-precision Fused Multiply-and-Accumulate (FMAC) operations. FIG. 1A does not illustrate the exponent datapath since it is not germane to the embodiments that will be described below.

Further, as will be appreciated by those skilled in the art, it is noted that a packed single format contains two individual single-precision values. The first (low) value includes a twenty-four bit mantissa that is right justified in the 64-bit operand field, and the second (high) value includes another twenty-four bit mantissa that is left justified in the 64-bit operand field, with sixteen zeros included between the two single-precision values. In this regard, it is noted that although the APU is illustrated as performing two single-precision operations in parallel using a "packed single" format, the APU can perform extended-precision, double-precision, and single-precision operations.

The illustrated portion of the arithmetic processing unit 200 includes operand registers 120, 122, and 124, result register 126, a partial product array 240, 245 that includes a partial product generator 240 and a partial product reducer 245 (that includes a carry-save adder (CSA) array 250 and a carry-save adder (CSA) 280), a sign control 260, a complement module 270 that includes portions 270-1 and 270-2, alignment modules 272, 274, 276, leading zero anticipator (LZA) modules 282, 284, 286, a carry-propagate adder (CPA) 290, normalizer modules 292, 293, and rounder modules 296, 297.

Operand Registers and Operand Format

Although not illustrated in FIG. 1A, the APU is coupled to a memory source that provides a multiplier operand, a multiplicand operand and optionally an addend operand. The memory source can be, for example, a plurality of register files or a memory bank.

Operand registers 120, 122, and 124 can each contain data values that can be floating point numbers having either a single-precision, double-precision, extended-precision or packed single-precision format. In the embodiments that will be described below, each operand register 120, 122, 124 contains two single-precision operands in a packed single-precision format (i.e., two individual single-precision values separated by zeros). An input A (not illustrated) can be provided to operand register 120, an input B (not illustrated) can be provided to operand register 122, an input C (not illustrated) can be provided to operand register 124, and an output result is provided to register 126. Inputs A and B are a multiplicand and a multiplier, respectively, and input C is an addend.

An instruction register (not illustrated) can contain an instruction (also referred to as an operation code and abbreviated as "opcode"), which identifies the instruction that is to be executed. The opcode specifies not only the arithmetic operation to be performed, but also the precision of the result that is desired. In accordance with some of the disclosed embodiments that will be described below, it is presumed that the instruction register provides a fused multiply-and-accumulate (FMAC) instruction/opcode so that a FMAC operation can be executed with respect to operands having a packed single-precision, floating point format.

A control module (not illustrated) has an input to receive an instruction from instruction register and can provide control signals to the arithmetic processing unit 200 to perform a multiply operation or a multiply-and-accumulate operation. For example, control module, upon receiving a fused multiply-and-accumulate (FMAC) instruction/opcode, can configure the portion of the arithmetic processing unit 200 to perform the indicated computation and to provide a packed single-precision result. Moreover, the control signal from the control module can configure the arithmetic processing unit 200 to interpret each of input values A, B, C as representing an operand of any of the supported precision modes, and more specifically, in this case, as representing operands of the packed single-precision mode.

These operands can be processed to perform a multiply operation or a multiply-and-accumulate operation as specified by an instruction to generate a result that is provided to result register 126. To execute a multiply-and-accumulate instruction, such as floating-point multiply-and-accumulate operation, operands A and B are multiplied together to provide a product, and operand C is added to the product. A multiply instruction, such as a floating-point multiply (FMUL), is executed in substantially the same way except operand C is set to a value of zero.

As noted above, operand data can have a packed single-precision format in which the operand data is split into high and low portions or parts that are processed separately. Because the arithmetic processing unit 200 is configured to execute two concurrent single-precision operations, operand register 120 includes portions 120-1 and 120-2, operand register 122 includes portions 122-1 and 122-2, operand register 124 includes portions 124-1 and 124-2, and result register 126 includes portions 126-1 and 126-2. To explain further, each input value provided from operand registers 120, 122, 124, contains two single-precision operands, a "high" operand and a "low" operand. In other words, each input value A, B, C represents two individual single-precision operands, and to illustrate this in FIG. 1A, the operand register 120 includes portions 120-1 and 120-2, operand register 122 includes portions 122-1 and 122-2, operand register 124 includes portions 124-1 and 124-2, and result register 126 includes portions 126-1 and 126-2. Portion 120-1 of operand register 120 contains a single-precision value corresponding to a high-multiplicand operand (AH), and portion 120-2 of operand register 120 contains a single-precision value corresponding to a low-multiplicand operand (AL). Portion 122-1 of operand register 122 contains a single-precision value corresponding to a high-multiplier operand (BH), and portion 122-2 of operand register 122 contains a single-precision value corresponding to a low-multiplier operand (BL). Portion 124-1 of operand register 124 contains a single-precision value corresponding to a high-addend operand (CH), and portion 124-2 of operand register 124 contains a single-precision value corresponding to a low-addend operand (CL). During a FMAC calculation the three high operands 120-1, 122-1, 124-1 can be used to compute a high result, (AH*BH)+CH=RH, and the three low operands 120-2, 122-2, 124-2 can be used to compute a low result (AL*BL)+CL=RL.

In one implementation that is illustrated in FIG. 1A, the arithmetic processing unit can be implemented using a five pipeline stages.

First and Second Pipeline Stages

The first pipeline stage and the second pipeline stage include the registers 230 and 232, a partial product array that include the partial product generator 240 and the partial product reducer 245, the sign control 260, the complement module 270 that includes portions 270-1 and 270-2, and the alignment modules 272, 274, 276.

Although not illustrated in FIG. 1A, it is noted that during the first pipeline stage, the exponent data path calculates the exponent of the product, and the multiply operation begins. During the second pipeline stage, the exponent data path (not illustrated in FIG. 1A) compares exponents of the product and the addend, and selects the larger of the two as a preliminary exponent of the result.

As illustrated in FIG. 1A, operand register 120, operand register 122, and registers 230, 232 are coupled to partial product generator 240. During the first pipeline stage, the partial product generator 240 uses the multiplier operands (AH, AL) 120-1, 120-2 and the multiplicand operands (BH, BL) 122-1, 122-2 to generate thirty-two partial products 242-1 . . . 242-32 that are provided to CSA array 250, and to generate a thirty-third partial product 242-33 that is provided to CSA 280. In particular, partial product generator 240 uses the contents of register 120-2 to calculate 13 least significant partial products 242-0 . . . 242-12, and uses the contents of register 120-1 to calculate 13 most significant partial products 242-20 . . . 242-32. The middle eight partial products 242-13 . . . 242-19 can be calculated without using the value provided by either register 120-1 or 120-2.

Figure 1B:
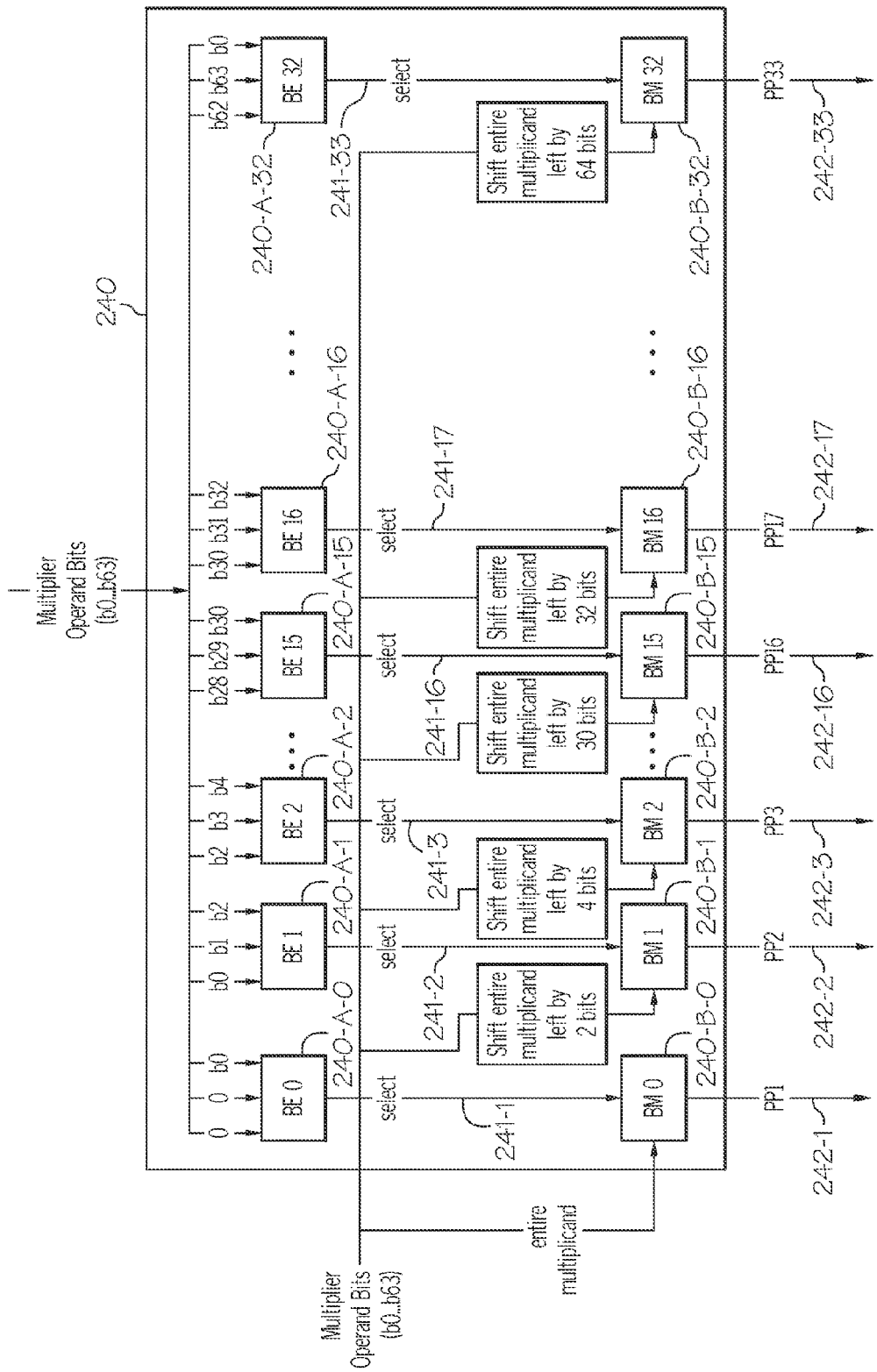
FIG. 1B is a logical block diagram illustrating a partial product generator in accordance with one specific embodiment of the present disclosure.

FIG. 1B is a logical block diagram illustrating a partial product generator 240 in accordance with one specific embodiment of the present disclosure. The partial product generator 240 includes booth encoders 240-A-0 . . . 240-A-32 and corresponding booth multiplexers 240-B-0 . . . 240-B-32. In one non-limiting embodiment that will be described with reference to FIG. 1B for purposes of illustration, the multiplier operand includes sixty-four bits (b0 . . . b63), the multiplicand operand includes sixty-four bits (b0 ... b63), and there are thirty-three each of the booth encoders 240-A-0 ... 240-A-32 and the booth multiplexers 240-B-0 ... 240-B-32.

Each of the booth encoders 240-A-0 ... 240-A-32 is configured to perform booth encoding (e.g., a radix-4 Booth recoding) on a portion of the multiplier operand to generate particular select signals. Each of the booth encoders 240-A-0 ... 240-A-32 receives three bits of the multiplier operand (or a "triplet of bits" of the multiplier operand) that serve as control signals. Between any two consecutive booth encoders 240-A-0 ... 240-A-32 there is a one bit overlap between the triplet of bits they receive. For instance, the first booth encoder 240-A-0 would receive bit b0 of the multiplier operand along with padding bits 0, 0, the second booth encoder 240-A-1 would receive bits b0, b1, b2 of the multiplier operand, the third booth encoder 240-A-2 would receive bits b2, b3, b4 of the multiplier operand, the fourth booth encoder (not illustrated in FIG. 1B) would receive bits b4, b5, b6 of the multiplier operand, and so on. With respect to the first booth encoder 240-A-0 it is noted that it receives only bit b0 of the multiplier operand along with padding bits 0, 0 since this is required when scanning the multiplier to correctly generate the halved number of possibly positive or negative 1× and 2× multiplicand multiples.

Each of the booth encoders 240-A-0 ... 240-A-32 operates in parallel and performs booth encoding on the triplet of bits that it receives to generate the particular select signals 241. A first signal can be used to instruct a corresponding booth multiplexer to select a 1× multiple of the bits of the multiplicand operand, a second signal can be used to instruct a corresponding booth multiplexer to select a 2× multiple of the bits of the multiplicand operand, and a third signal can be used to instruct a corresponding booth multiplexer to select (1b) a complement/inversion of the first or second select signal. As such, depending on which of the first, second and/or third select signals are enabled, a corresponding booth multiplexer can be instructed to select either: (1) a 1× multiple of the bits of the multiplicand operand, or (2) a compliment/inversion of the 1× multiple of the bits of the multiplicand operand, or (3) a 2× multiple of the bits of the multiplicand operand, or (4) a complement of 2× multiple of the bits of the multiplicand operand.

Each of the booth multiplexers 240-B-0 ... 240-B-32 is configured to receive a particular version of the multiplicand operand, and one particular select signal generated by a corresponding one of the booth encoders 240-A-0 ... 240-A-32. Each of the booth multiplexers 240-B-0 ... 240-B-32 operate in parallel on their respective inputs to generate a partial product (such that the booth multiplexers 240-B-0 ... 240-B-32 collectively generate N partial products). For example, in one implementation that is illustrated in FIG. 1B, there are thirty-three booth multiplexers 240-B-0 ... 240-B-32 that can generate a total of thirty-three partial products PP1 ... PP33.

In one implementation, each of the booth multiplexers 240-B-0 ... 240-B-32 receives all bits of the multiplicand; however, at each of booth multiplexers 240-B-1 ... 240-B-32 (except for the first booth multiplexer 240-B-0) the bits of the multiplicand are shifted left by two places (or bit positions). In other words, a first booth multiplexer 240-B-0 receives the multiplicand operand, and each of the other booth multiplexers 240-B-1 ... 240-B-1 ... 240-B-32 receive a particular bit-shifted version of the multiplicand operand that is shifted by two bits with respect to the prior one. As such, between any two consecutive ones of the booth multiplexers 240-B-1 ... 240-B-32, the version of the multiplicand that they receive is shifted by two bits with respect to the one received by the prior booth multiplexer. For instance, the first booth multi-plexer 240-B-0 would receive an unshifted version of the multiplicand operand, the second booth multiplexer 240-B-1 would receive a version of the multiplicand operand that is shifted by two bits, the third booth multiplexer 240-B-2 would receive a version of the multiplicand operand that is shifted by four bits, the fourth booth multiplexer 240-B-3 would receive a version of the multiplicand operand that is shifted by six bits, and so on.

Partial product generator 240 is coupled to a partial product reducer 245 (or "carry-save adder Wallace tree") that includes a CSA array 250 and a CSA 280. The partial products 242-1 ... 242-33 are provided to the partial product reducer 245. In particular, thirty-two partial products 242-1 ... 242-32 are provided to CSA array 250, and a thirty-third partial product 242-33 that is provided to CSA 280. In general, the partial product reducer 245 is used to compress the thirty-three partial products 241-1 ... 241-33 to generate intermediate and carry 288 and sum 289 results. Further details regarding the partial product reducer 245 in accordance with the disclosed embodiments will be described below with reference to FIG. 1C.

Portion 124-1 of operand register 124 is coupled to portion 270-1 of complement module 270, and portion 124-2 of operand register 124 is coupled to portion 270-2 of complement module 270. Sign control 260 is also coupled to the complement modules 270-1, 270-2. If the sign control 260 indicates that an effective subtract is being computed, portions 270-1 and 270-2 will "flip" the bits of their input to produce the output. The outputs of complement module 270 portions 270-1, 270-2 are coupled to alignment module 272.

FIG. 1A illustrates other details regarding the third pipeline stage, the fourth pipeline stage and the fifth pipeline stage that are not germane to the disclosed embodiments, and therefore are not described herein for sake of clarity. Further information regarding the third pipeline stage, the fourth pipeline stage and the fifth pipeline stage are described, for example, in U.S. patent application Ser. No. 13/172,590, filed Jun. 29, 2011, entitled "METHODS AND APPARATUS FOR COMPRESSING PARTIAL PRODUCTS DURING A FUSED MULTIPLY-AND-ACCUMULATE (FMAC) OPERATION ON OPERANDS HAVING A PACKED-SINGLE-PRECISION FORMAT," and assigned to the assignee of the present invention, which is incorporated herein by reference in its entirety.

Figure 1C:
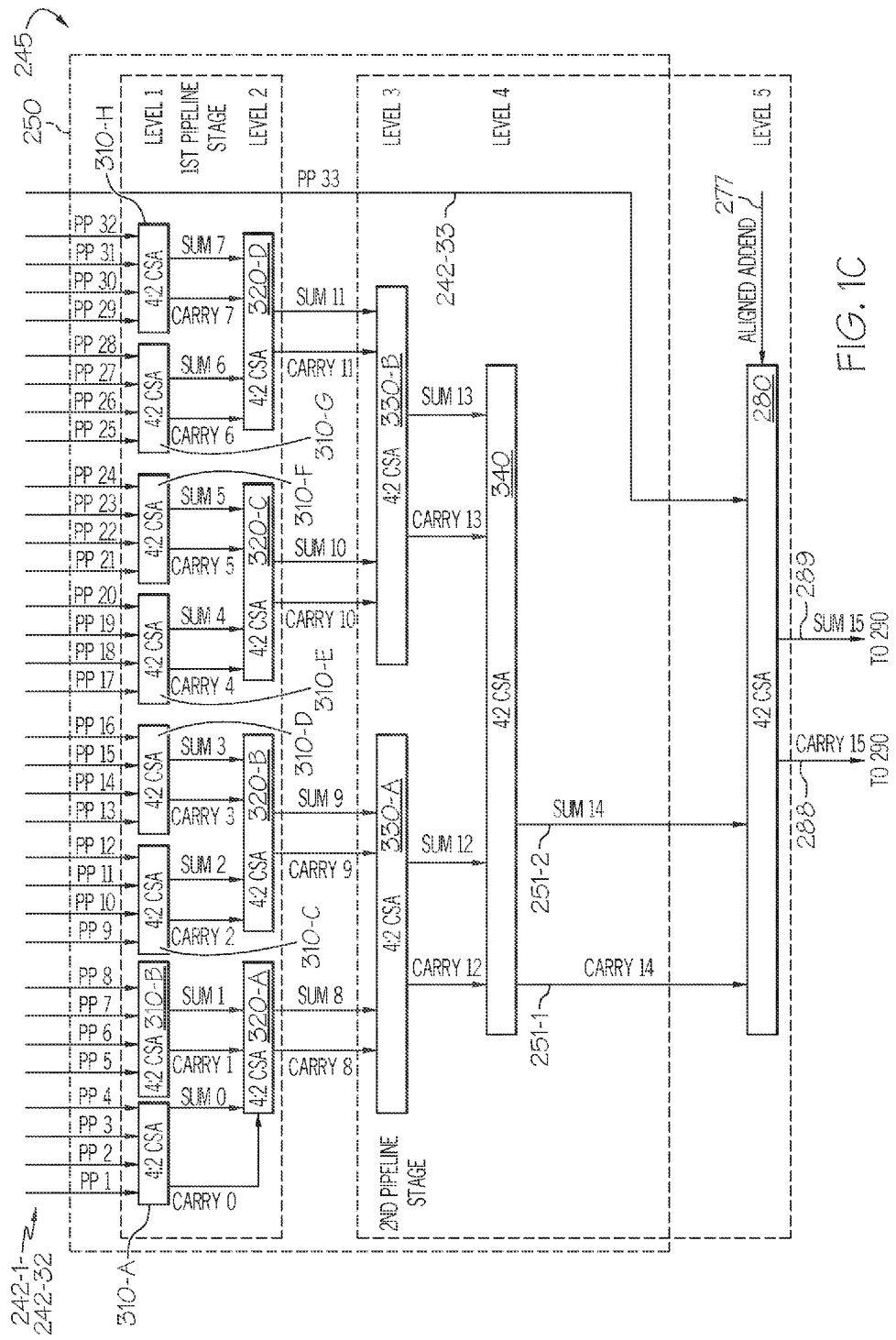
FIG. 1C is a logical block diagram illustrating a compression tree architecture of a partial product reducer in accordance with one embodiment of the present disclosure.

FIG. 1C is a logical block diagram illustrating a compression tree architecture of a partial product reducer 245 that is configured to operate in accordance with a specific embodiment of the present disclosure. As mentioned above, the partial product reducer 245 includes the carry-save adder (CSA) array 250 coupled the CSA 280. Although not illustrated in FIG. 1C, in some embodiments, the partial product reducer 245 can include other elements such as storage elements (flip-flops), additional compressor levels that include additional carry-save adders, etc. For sake of clarity, these additional elements are not illustrated. In general, it is noted that the partial product reducer 245 receives partial products (PP1 ... PP33) 242-1 ... 242-33 as its inputs. For purposes of illustration, in the following example, which illustrates one exemplary implementation, it is assumed that there are thirty-three partial products 242-1 ... 242-33.

The carry-save adder (CSA) array 250 includes a plurality of carry-save adders 310-A ... 310-H, 320-A ... 320-D, 330-A, 330-B, 340 that are distributed over four compressor levels (LEVELS 1 ... 4). The carry-save adders 310-A ... 310-H, 320-A ... 320-D, 330-A, 330-B, 340 and the CSA 290 are used to reduce the thirty-two partial products 242-1 ... 242-32 and the thirty-third partial product 242-33 to a 129-bit carry vector 351-1 and a 128-bit sum vector 351-2 that represent the sum of the 33 partial products. In this particular implementation, the compressor levels (LEVEL 1, LEVEL 2) are part of the first pipeline stage, and compressor levels (LEVEL 3, LEVEL 4) are part of the second pipeline stage.

The first compressor level (LEVEL 1) includes eight 4:2 carry-save adders 310-A . . . 310-H that are configured to compress the plurality of partial products (PP1 . . . PP32) except for a last partial product (P33) to generate first outputs. As such, in the first compressor level (LEVEL 1), each of the 4:2 carry-save adders 310-A . . . 310-H receives four partial products 242 and compresses them to generate a carry output and a sum output. Each of the partial products 241-1 . . . 241-32 that is input to the partial product reducer 245 is a bit vector that includes, for example, 73 bits (or is "73 bits wide") in one exemplary implementation. For instance, 4:2 carry-save adder 310-A receives four partial products 242-1 . . . 242-4 and compresses them to generate a carry output 0 and a sum output 0 (e.g., two output vectors whose sum is equal to the sum of the PP1 . . . PP4 inputs 242-1 . . . 242-4), whereas 4:2 carry-save adder 310-B receives four partial products 242-5 . . . 242-8 and compresses them to generate a carry output 1 and a sum output 1. Each of the carry and sum outputs generated by the 4:2 carry-save adders 310-A . . . 310-H in the first compressor level (LEVEL 1) can be, for example, 81 bits (or is "81 bits wide") in one exemplary implementation.

The second compressor level (LEVEL 2) includes four 4:2 carry-save adders 320-A . . . 320-D that are configured to compress the first outputs (generated by the first compressor level 310) to generate second outputs. Each of the 4:2 carry-save adders 320-A . . . 320-D receives two carry inputs and two sum inputs, and compresses them to generate a carry output and a sum output. For instance, 4:2 carry-save adder 320-A receives carry output 0, sum output 0, carry output 1 and sum output 1, and compresses them to generate a carry output 8 and a sum output 8, whereas 4:2 carry-save adder 320-B receives carry output 2, sum output 2, carry output 3 and sum output 3 and compresses them to generate a carry output 9 and a sum output 9. Each of the carry and sum outputs generated by the carry-save adders 320-A . . . 320-D in the second compressor level (LEVEL 2) can be, for example, 97 bits (or is "97 bits wide") in one exemplary implementation.

The third compressor level (LEVEL 3) includes two 4:2 carry-save adders 330-A, 330-B that are configured to compress the second outputs (generated by the second compressor level 320) to generate third outputs. Each of the 4:2 carry-save adders 330-A, 330-B receives two carry inputs and two sum inputs, and compresses them to generate a carry output and a sum output. For instance, 4:2 carry-save adder 330-A receives carry output 8, sum output 8, carry output 9 and sum output 9, and compresses them to generate a carry output 12 and a sum output 12, whereas 4:2 carry-save adder 330-B receives carry output 10, sum output 10, carry output 11 and sum output 11 and compresses them to generate a carry output 13 and a sum output 13. Each of the carry and sum outputs generated by the carry-save adders 330-A, 330-B in the third compressor level (LEVEL 3) can be, for example, 130 bits (or is "130 bits wide") in one exemplary implementation.

The fourth compressor level (LEVEL 4) includes a 4:2 carry-save adder 340 that is configured to compress the third outputs (generated by the third compressor level 330) and compresses them to generate a fourth carry output 251-1 and a fourth sum output 251-2. For instance, the 4:2 carry-save adder 340 receives carry output 12, sum output 12, carry output 13 and sum output 13 and compresses them to generate a carry output 14 and a sum output 14. The carry output 14 and sum output 14 generated by the 4:2 carry-save adder 340 in the fourth compressor level (LEVEL 4) can be, for example, 128 bits (or is "128 bits wide") in one exemplary implementation.

The fifth compressor level (LEVEL 5) includes CSA 280. CSA 280 is another 4:2 carry-save adder coupled to the CSA array 250. CSA 280 receives carry output 14 that were generated by the 4:2 carry-save adder 340, the partial product (PP33) 242-33, and compresses these inputs to generate a carry output 288 that can be 130-bits in one exemplary implementation. It is noted that the aligned addend 277 generated by the alignment modules 274 is only used by the CSA 280 when executing a multiply and add operation, and therefore is not used in this implementation.

One drawback of a conventional APU architecture or layout used to implement a multiplier module is that the booth encoder circuitry is arranged at periphery of multiplier module. As a result, the signals communicated from the booth encoders must travel a significant distance to before reaching the booth multiplexers, and the wiring path lengths between the booth encoders and corresponding booth multiplexers is significant in this layout. In addition, the partial products generated by the booth multiplexers must also travel a significant distance to reach the CSA circuitry that is implemented at various different compressor levels (when the CSA circuitry is physically separated from the booth multiplexers). This layout has numerous drawbacks.

It would be desirable to reduce layout area of the APU so that it has a compact layout. It would also be desirable if performance of the APU can be improved, and if power consumed and dissipated by the APU can be reduced.

In accordance with the disclosed embodiments, a split or folded multiplier architecture is provided in which the booth encoder circuitry, booth multiplexer circuitry and compressor circuitry have an optimized layout.

Figure 2:
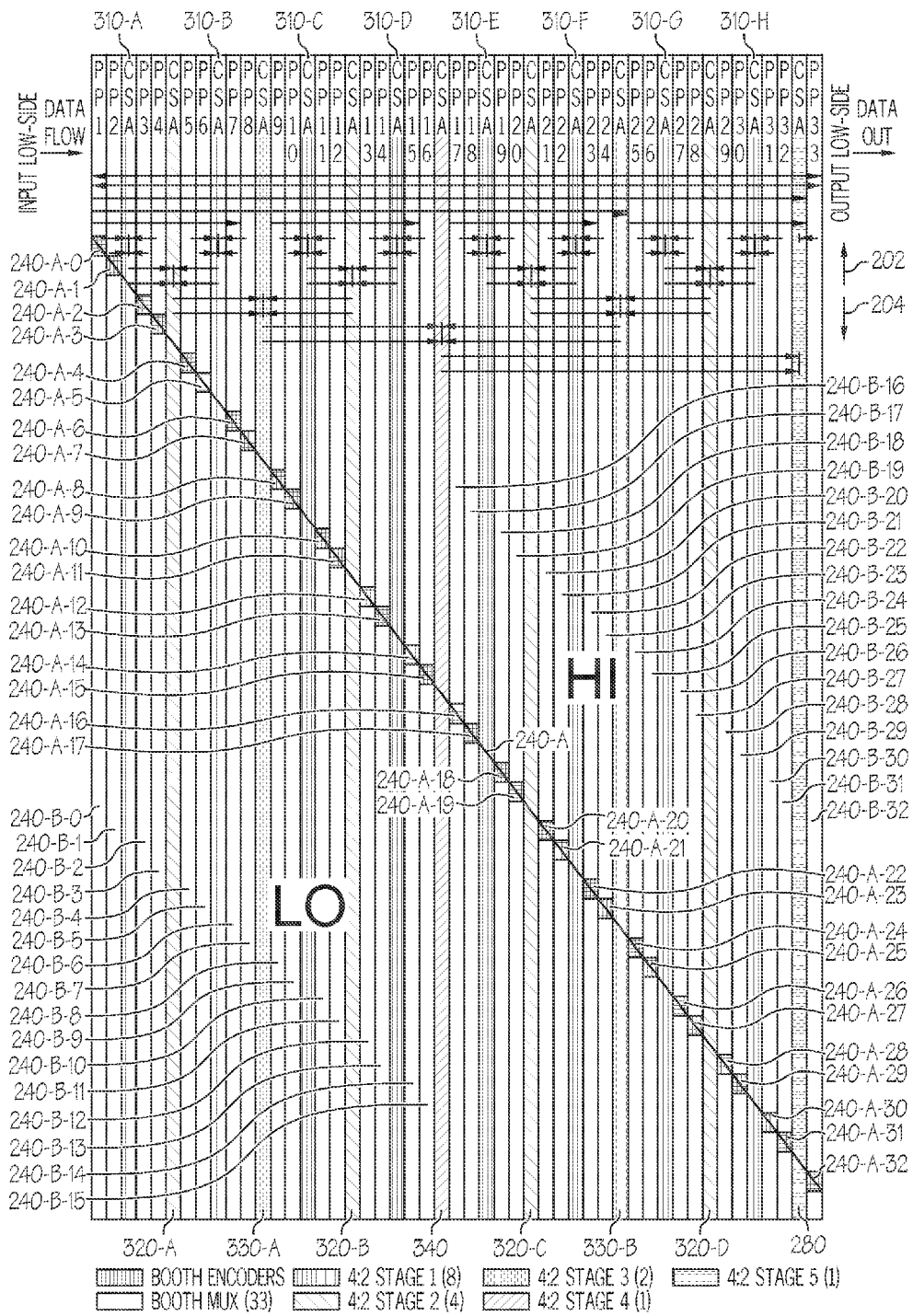
FIG. 2 is a block diagram illustrating the physical layout of a partial product array including the arrangement of booth encoders, booth multiplexers, and compressors in accordance with a specific embodiment of the present disclosure.

FIG. 2 is a block diagram illustrating the physical layout of a partial product array 240, 245 including the arrangement of booth encoders 240-A, booth multiplexers 240-B, and compressors 280, 310, 320, 330, 340 in accordance with a specific embodiment of the present disclosure.

As illustrated in FIG. 2, the partial product array 240, 245 has a split or folded layout that is split into a low-side 302 and a high-side 304. Splitting the layout into the low-side 302 and the high-side 304 enables the multiplier to fit into a rectangular physical footprint which allows for efficient and compact integration in the datapath of a micropressor die. The high side of the partial product array, with redundant partial products on the high side for bits that spill over from the compression, is effectively slid under the low side to accomplish this task_.

In FIG. 2, the partial products PP1 . . . PP33 (that are generated by the various booth multiplexers 240-B-0 . . . 240-B-32 and processed by the various carry-save adders 310-A . . . 310-H, 320-A . . . 320-D, 330-A, 330-B, 340) are indicated along the top and bottom of the diagram. As described above, the various carry-save adders 310-A . . . 310-H, 320-A . . . 320-D, 330-A, 330-B, 340 make up the compressor levels of the carry-save adder array 250.

As described above, bits of the multiplier operand are communicated from a memory source to the booth encoders 240-A. The booth encoders 240-A then each use a portion of the multiplier operand to generate select signals that are then routed north 202 and south 204 (along the columns in the direction of arrows 202, 204) to the booth multiplexers 240-B that are arranged above and below the booth encoders.

In accordance with the disclosed embodiments, the plurality of booth encoders 240-A-0 . . . 240-A-32 are arranged along a substantially diagonal path that extends between the low-side 302 and the high-side 304.

This layout allows for a reduced distance wiring path between the externally sourced multiplier input and booth encoders 240-A-0 . . . 240-A-32. In one implementation, the booth encoder circuitry is arranged between the low and high sides of the split/folded multiplier module with a substantially diagonal layout (e.g., diagonally embedded inside an M (e.g., 64) bit by N (e.g., 64) bit multiplier module). By arranging the booth encoders in this manner the wiring path lengths between the externally sourced multiplier input and the booth encoders can be reduced and area for additional driver circuitry can be reduced.

In addition, the carry-save adders 310-A . . . 310-H, 320-A . . . 320-D, 330-A, 330-B, 340 are each arranged in an interleaved manner with/among the booth multiplexers 240-B. This arrangement essentially seeds the placement of the booth multiplexers 240-B to allow for the routing distance between the signals for the booth multiplexers 240-B and the first compressor stage & the distance for the signals to all successive compressor stages to be minimal for the Wallace tree type adder.

Figure 3:
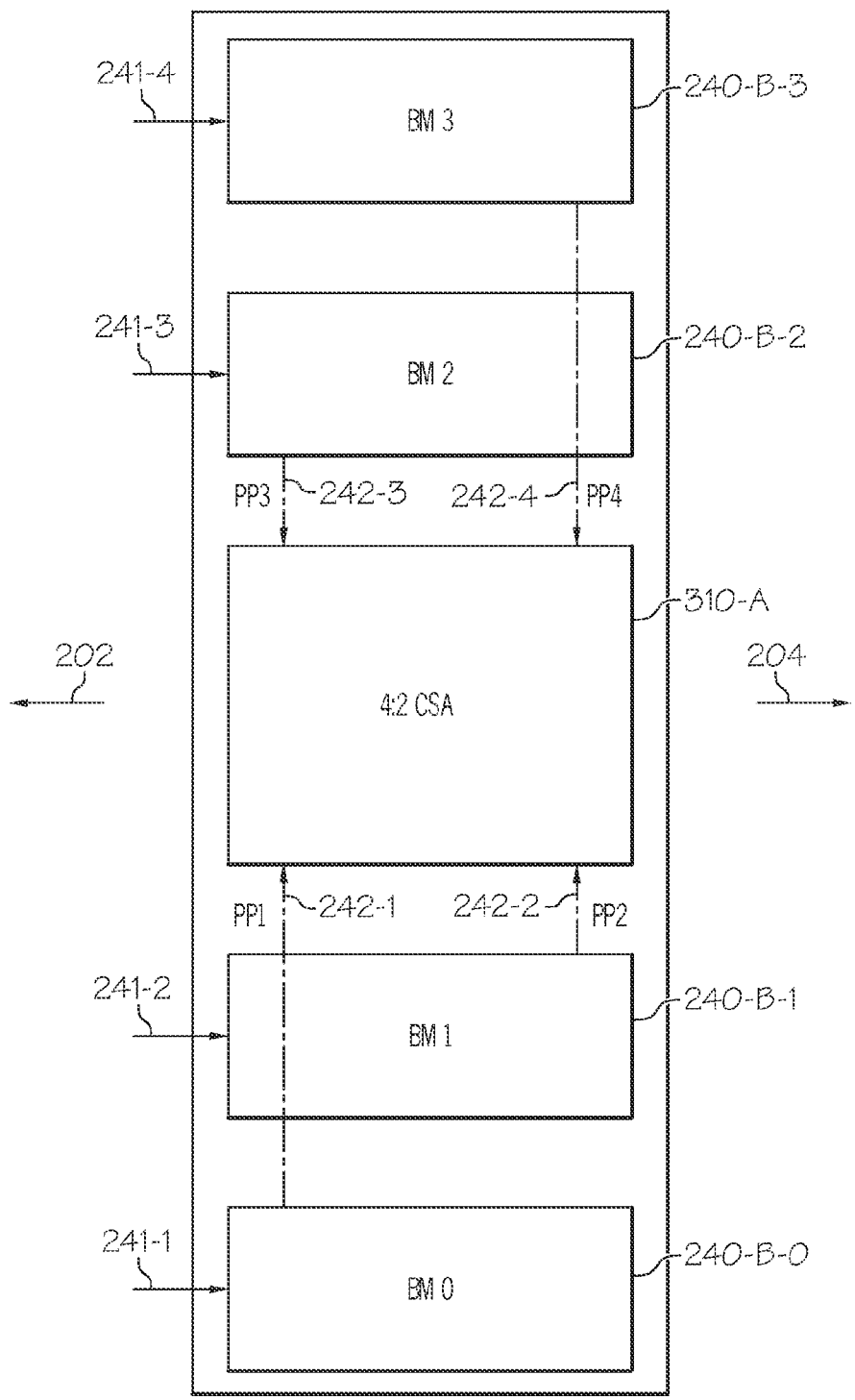
FIG. 3 is a block diagram illustrating one example of the physical layout of booth multiplexers with respect to a carry-save adder in accordance with a specific embodiment of the present disclosure.

FIG. 3 is a block diagram illustrating an example of a physical layout of booth multiplexers 240-B-0 . . . 240-B3 with respect to a carry-save adder 310-A in accordance with a specific embodiment of the present disclosure. The booth multiplexers 240-B-0 . . . 240-B3 communicate the partial products to the CSAs over interconnections between the circuits. As illustrated in FIG. 3, carry-save adder 310-A is centered among the booth multiplexers 240-B-0 . . . 240-B3. Other variations of this are illustrated in FIG. 2.

In accordance with the disclosed embodiments, the booth multiplexers are interleaved with CSAs of the various compressor levels that are used to reduce the partial products. By interleaving the compressor circuitry with the booth multiplexer circuitry, the wiring path lengths that the partial products must travel over to reach the CSAs of the various compressor levels can be reduced in comparison to conventional approaches. In aggregate, this interleaved arrangement helps to minimize the total distance traveled by the partial products PP1 . . . PP33 as they travel from the booth multiplexers 240 to the carry-save adders 310-A . . . 310-H. The arrangement of the carry-save adders 310-A . . . 310-H with respect to the carry-save adders 320-A . . . 320-D also helps minimize the total wiring distance traveled by the carry and sum outputs of the carry-save adders 310-A . . . 310-H as they travel to the carry-save adders 320-A . . . 320D. The arrangement of the carry-save adders 320-A . . . 320-D with respect to carry-save adders 330-A, 330-B also helps minimize the total wiring distance traveled by the carry and sum outputs of the carry-save adders 320-A . . . 320-D as they travel to the carry-save adders 330-A, 330-B. The arrangement of the carry-save adders 330-A, 330-B with respect to carry-save adder 340 also helps minimize the total wiring distance traveled by the carry and sum outputs of the carry-save adders 330-A, 330-B as they travel to the carry-save adder 340. Because the carry-save adders are arranged in such an interleaved manner among the booth multiplexers 240-B, this can also help to reduce the layout area occupied by this circuitry along with the propagation delay though this circuitry.

In the particular non-limiting implementation that is illustrated in FIG. 2, each one of the carry-save adders 310-A . . . 310-H are arranged halfway between and coupled to two pairs of the booth multiplexers 240-B to receive the four partial products from the two pairs of the booth multiplexers 240-B. Similarly, the carry-save adders 320-A . . . 320-D are arranged between two pairs of the booth multiplexers 240-B, and each one of the carry-save adders 320-A . . . 320-D are also arranged halfway between and coupled to two of the carry-save adders 310 such that any particular carry-save adder 320 is configured to receive first outputs from the two carry-save adders 310 that it is coupled to. In addition, carry-save adders 330-A, 330-B are arranged between two pairs of the booth multiplexers 240-B (where each of the two pairs is arranged between a pair of the carry-save adders 310). The carry-save adders 330-A, 330-B are also arranged halfway between and coupled to two of the carry-save adders 320 such that each one of the carry-save adders 330-A, 330-B is configured to receive second outputs from the two carry-save adders 320 that it is coupled to. Finally, the carry-save adder 340 also arranged between two pairs of the booth multiplexers 240-B, and is arranged halfway between and coupled to the carry-save adders 330 such that that the carry-save adder 340 receives the third outputs from the carry-save adders 330 that it is coupled to. Some of the advantages of arranging the carry-save adders of the various compressor levels among the booth multiplexers 240 in this manner are explained above.

In accordance with some implementations of the disclosed embodiments, including those illustrated in FIGS. 1A and 1C when the APU 200 is configured to implement a multiply-and-accumulate operation, the partial product reducer 245 can also include a carry-save adder 280, that serves as a fifth compressor level, coupled to the carry-save adder 340 of the carry-save adder array 250. In other words, the carry-save adder 280 is implemented in embodiments when the arithmetic processing unit 200 is configured to perform a multiply-and-accumulate operation on the operands. This carry-save adder 280 is arranged in an interleaved manner between one pair of the booth multiplexers 240-B-30, 240-B-31 and a final booth multiplexer 240-B-32. The carry-save adder 280 is configured to generate result outputs 288, 289 based on the partial product (PP 33) 242-33, an aligned addend 277, the fourth carry output 251-1 and the fourth sum output 251-2. The result outputs comprise a carry result output 288 and a sum result output 289.

Conclusion

Thus, in accordance with the disclosed embodiments, a split or folded architecture is provided that has an optimized booth encoder layout along with interleaved booth multiplexers and compressors. This allows for the propagation delay through the multiplier, as well as the layout area of the partial product array (that includes the partial product generator 240 and the partial product reducer 245) to be reduced. The improved layout reduces wiring path lengths between the multiplier input and booth encoders, as well as the wiring path lengths between the booth multiplexers and compressor (or CSA) circuitry and also between all compressor circuitry stages. Additional circuitry that would normally be required to drive signals over greater distances can therefore be removed. In addition, propagation delay is reduced, while die area and power consumed can also be lowered.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multiplier module for digitally multiplying a multiplicand operand by a multiplier operand, comprising:
   a partial product array having a folded layout that is split into a low-side and a high-side, comprising:
      a plurality of booth encoders that are each configured to generate a particular select signal based on a portion of the multiplier operand, wherein the plurality of booth encoders are arranged along a substantially diagonal path that extends between the high-side and the low-side;
      a plurality of booth multiplexers that collectively generate a plurality of partial products based on the multiplicand operand and the select signals generated by the booth encoders; and
      a carry-save adder array comprising: a plurality of compressor levels that are interleaved with the plurality of booth multiplexers.

2. A multiplier module according to claim 1, wherein the plurality of compressor levels comprise:
   n compressor levels including a first through nth compressor levels, wherein each of the n compressor levels comprise at least one carry-save adder, and
   wherein each carry-save adder of a $n^{th}$ compressor level is interleaved between carry-save adders of a $n-1^{th}$ compressor level, and
   wherein each of the carry-save adders are arranged in an interleaved manner between at least two booth multiplexers.

3. A multiplier module according to claim 2, wherein the plurality of compressor levels comprise:
   a first compressor level comprising: a plurality of first carry-save adders that are configured to compress the plurality of partial products except for a last partial product to generate first outputs;
   a second compressor level comprising a plurality of second carry-save adders that are configured to compress the first outputs to generate second outputs;
   a third compressor level comprising a plurality of third carry-save adders that are configured to compress the second outputs to generate third outputs; and
   a fourth compressor level comprising a fourth carry-save adder that is configured to compress the third outputs to generate a fourth carry output and a fourth sum output,
   wherein each one of the plurality of first carry-save adders are arranged in an interleaved manner among the booth multiplexers, wherein each one of the plurality of second carry-save adders are arranged in an interleaved manner among the booth multiplexers, wherein each one of the plurality of third carry-save adders are arranged in an interleaved manner among the booth multiplexers, and wherein the fourth carry-save adder is arranged among the booth multiplexers.

4. A multiplier module according to claim 3, wherein each one of the plurality of first carry-save adders are arranged between two pairs of the booth multiplexers and coupled to the two pairs of the booth multiplexers to receive the partial products from the two pairs of the booth multiplexers that that particular first carry-save adder is coupled to.

5. A multiplier module according to claim 3, wherein each one of the plurality of second carry-save adders are arranged between two pairs of the booth multiplexers,
   wherein each one of the plurality of second carry-save adders are arranged between and coupled to two of the first carry-save adders such that that particular second carry-save adder is configured to receive first outputs from the two of the first carry-save adders that it is coupled to.

6. A multiplier module according to claim 5, wherein each one of the plurality of third carry-save adders are arranged between two pairs of the booth multiplexers,
   wherein each one of the plurality of third carry-save adders are arranged between and coupled to two of the second carry-save adders such that that particular third carry-save adder is configured to receive second outputs from the two of the second carry-save adders that it is coupled to.

7. A multiplier module according to claim 6, wherein the fourth carry-save adder is arranged between two pairs of the booth multiplexers, wherein the fourth carry-save adder is arranged between and coupled to the third carry-save adders such that that the fourth carry-save adder is configured to receive the third outputs from the third carry-save adders that it is coupled to.

8. A multiplier module according to claim 1, wherein each of the plurality of booth encoders is configured to perform booth encoding on a portion of the multiplier operand generate a particular select signal.

9. A multiplier module according to claim 8, wherein the each of the plurality of booth encoders is configured to receive a triplet of bits of the multiplier operand that serve as control signals, and perform booth encoding on that triplet of bits to generate the particular select signal,
   wherein each particular select signal is used to instruct a corresponding booth multiplexer to select one of:
   (1) a 1× multiple of the bits of the multiplicand operand,
   (2) a 2× multiple of the bits of the multiplicand operand,
   (3) a complement of the 1× multiple of the bits of the multiplicand operand, or
   (4) a complement of 2× multiple of the bits of the multiplicand operand.

10. A multiplier module according to claim 1, wherein each of the plurality of booth multiplexers is configured to:
    receive inputs comprising: a particular version of the multiplicand operand, and one of the particular select signals generated by one of the booth encoders; and
    wherein each of the booth multiplexers operate in parallel on their respective inputs to generate a partial product such that the plurality of booth multiplexers collectively generate the plurality of partial products.

11. A processor configured to process a multiplicand operand and a multiplier operand, comprising:
    a partial product array having a folded layout that is split into a low-side and a high-side, comprising:
       a partial product generator:
          a plurality of booth encoders that are arranged along a substantially diagonal path that extends between the high-side and the low-side, wherein each of the plurality of booth encoders is configured to perform booth encoding on a portion of the multiplier operand to generate a particular select signal; and
          a plurality of booth multiplexers, wherein each of the booth multiplexers is configured to receive a particular version of the multiplicand operand, and one set of the particular select signals generated by one of the booth encoders, and to generate a partial product such that the plurality of booth multiplexers collectively generate a plurality of partial products;

a partial product reducer configured to receive and reduce the plurality of partial products to generate result outputs, the partial product reducer comprising:
a carry-save adder array comprising a plurality of compressor levels that are interleaved with the plurality of booth multiplexers.

12. A processor according to claim 11, wherein the plurality of compressor levels of the carry-save adder array, comprise:
a plurality of carry-save adders that are each arranged in an interleaved manner with the plurality of booth multiplexers.

13. A processor according to claim 12, wherein the plurality of compressor levels comprise:
a first compressor level comprising: a plurality of first carry-save adders that are configured to compress the plurality of partial products except for a last partial product to generate first outputs;
a second compressor level comprising a plurality of second carry-save adders that are configured to compress the first outputs to generate second outputs;
a third compressor level comprising a plurality of third carry-save adders that are configured to compress the second outputs to generate third outputs; and
a fourth compressor level comprising a fourth carry-save adder that is configured to compress the third outputs to generate a fourth carry output and a fourth sum output,
wherein each one of the plurality of first carry-save adders are arranged in an interleaved manner among the booth multiplexers, wherein each one of the plurality of second carry-save adders are arranged in an interleaved manner among the booth multiplexers, wherein each one of the plurality of third carry-save adders are arranged in an interleaved manner among the booth multiplexers, and wherein the fourth carry-save adder is arranged among the booth multiplexers.

14. A processor according to claim 13, wherein each one of the first carry-save adders, the second carry-save adders, the third carry-save adders, and the fourth carry-save adder comprises:
a four-to-two carry-save adder that receives four partial products and reduces the four partial products to two intermediate partial products.

15. A processor according to claim 13, wherein each one of the plurality of first carry-save adders are arranged between two pairs of the booth multiplexers and coupled to the two pairs of the booth multiplexers to receive the partial products from the two pairs of the booth multiplexers that that particular first carry-save adder is coupled to.

16. A processor according to claim 13, wherein each one of the plurality of second carry-save adders are arranged between two pairs of the booth multiplexers,
wherein each one of the plurality of second carry-save adders are arranged between and coupled to two of the first carry-save adders such that that particular second carry-save adder is configured to receive first outputs from the two of the first carry-save adders that it is coupled to.

17. A processor according to claim 16, wherein each one of the plurality of third carry-save adders are arranged between two pairs of the booth multiplexers,
wherein each one of the plurality of third carry-save adders are arranged between and coupled to two of the second carry-save adders such that that particular third carry-save adder is configured to receive second outputs from the two of the second carry-save adders that it is coupled to.

18. A processor according to claim 17, wherein the fourth carry-save adder is arranged between two pairs of the booth multiplexers, wherein the fourth carry-save adder is arranged between and coupled to the third carry-save adders such that that the fourth carry-save adder is configured to receive the third outputs from the third carry-save adders that it is coupled to.

19. A processor according to claim 13, wherein the arithmetic processor is configured as a fused multiply-and-accumulate processor that is configured to perform a multiply-and-accumulate operation on the operands, and wherein the partial product reducer further comprises:
a fifth compressor level coupled to the carry-save adder array, comprising:
a fifth carry-save adder, coupled to fourth carry-save adder of the fourth compressor level, and being configured to generate result outputs based on a partial product, an aligned addend, the fourth carry output and the fourth sum output, wherein the result outputs comprise a carry result output and a sum result output.

20. A processor according to claim 11, wherein the arithmetic processor is configured as a fused multiply-and-accumulate processor that is configured to perform a multiply-and-accumulate operation on the operands, and wherein the partial product reducer further comprises:
a final compressor level coupled to the carry-save adder array, comprising:
a final carry-save adder arranged in an interleaved manner between one pair of the booth multiplexers and a final booth multiplexer.

21. A processor according to claim 11, wherein the each of the plurality of booth encoders is configured to receive a triplet of bits of the multiplier operand that serve as control signals, and perform booth encoding on that triplet of bits to generate the particular select signal, and
wherein each particular select signal is used to instruct a corresponding booth multiplexer to select one of:
(1) a 1× multiple of the bits of the multiplicand operand,
(2) a 2× multiple of the bits of the multiplicand operand,
(3) a complement of the 1× multiple of the bits of the multiplicand operand, or
(4) a complement of 2× multiple of the bits of the multiplicand operand.

22. A processor according to claim 11, wherein each of the booth multiplexers is configured to receive inputs comprising: the particular version of the multiplicand operand, and one of the particular select signals generated by one of the booth encoders, and
wherein each of the booth multiplexers operate in parallel on their respective inputs to generate a partial product such that the plurality of booth multiplexers collectively generate the plurality of partial products.

23. A processor according to claim 11, wherein the plurality of compressor levels comprise:
n compressor levels including a first through nth compressor levels, wherein each of the n compressor levels comprise at least one carry-save adder, and
wherein each carry-save adder of a $n^{th}$ compressor level is interleaved between carry-save adders of a $n-1^{th}$ compressor level, and
wherein each of the carry-save adders are arranged in an interleaved manner between at least two booth multiplexers.

* * * * *